Oct. 20, 1942.　　　G. M. GIANNINI　　　2,299,620
ACOUSTIC APPARATUS
Filed Aug. 19, 1938
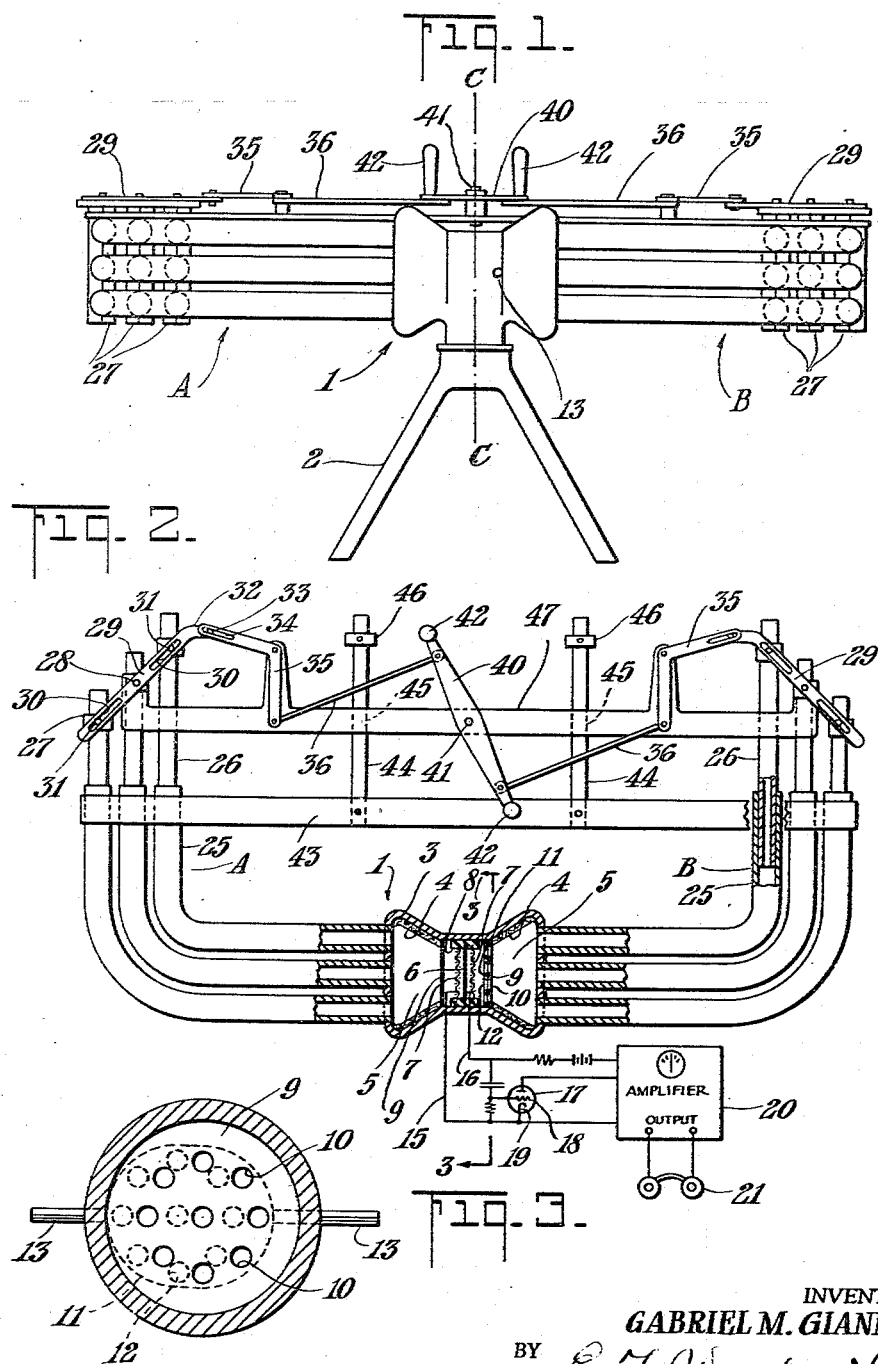
INVENTOR.
*GABRIEL M. GIANNINI*
BY
ATTORNEY.

Patented Oct. 20, 1942

2,299,620

UNITED STATES PATENT OFFICE 2,299,620

ACOUSTIC APPARATUS

Gabriel Maria Giannini, Great Neck, N. Y., assignor, by mesne assignments, to Associated Electric Laboratories, Inc., Chicago, Ill., a corporation of Delaware Application August 19, 1938, Serial No. 225,814

4 Claims. (Cl. 181—26)

My invention relates to acoustic apparatus and more particularly to devices for determining the direction of propagation of sound.

In many fields, particularly in marine navigation and in aviation, it is very desirable to locate the direction of propagation of sound in a simple, quick and accurate manner, and numerous types of devices have been proposed for this purpose. For example, one of the oldest devices comprises a pair of horns adapted to be connected one to each ear of an observer, and the binaural effect of hearing is utilized to determine the direction of the sound. However, to determine accurately the direction of sound it is necessary to use two pairs of horns and two observers, and the resulting apparatus is very bulky. Furthermore, the accuracy of such a device depends upon the human element, and also upon the frequency of the sound because there must be a certain relationship between the frequency and the horn openings to obtain the best results. Parabolic collectors have been used instead of horns, but this does not materially improve the accuracy of such devices.

It has also been suggested to use a device which operates on the principle of maximum sound intensity and comprises a cluster of tubes or resonant elements which are located in front of a microphone and are of the same length or of various lengths depending upon the frequency range to be covered. However, the directional effect of such devices is dependent upon the number of elements which resonate at a given frequency, and as a result these devices are more directional for high frequencies than for low frequencies.

In my U. S. Patent No. 2,172,871, issued September 12, 1939, I have described a sound-detecting device comprising two groups of tubes each of which is connected to one side of the diaphragm of a microphone, and which differ in acoustic wave length by one-half, or one-half plus an integer, of the wave length of the sound whose direction is to be determined. In this device the principle of minimum sound is used, and as a result it is much easier to locate accurately the device in the correct position. Although such a device gives excellent results as far as determining the direction of sound is concerned, it has the drawback that its discrimination is limited to a given wave length. Furthermore, if such a device is operated in a strong wind, or on a moving vehicle, such as a ship, a high and varying pressure might be produced on the diaphragm, which deleteriously affects the reading.

The main object of my invention is to overcome the above difficulties and to provide a sound-detecting device which is simple in construction, accurate in operation, and small in size.

Another object is to produce a device which is unaffected by wind pressure.

A further object is to provide a device which can detect sound of a wide range of frequencies.

A further object is to provide a device which can be adjusted so as to detect only one single frequency, or a wide band of frequencies anywhere in the sound spectrum.

A still further object is to provide a device which can be adjusted to give a more accurate angular discrimination.

In accordance with the invention, which is based on the principle that two sounds of the same frequencies, phase, and intensities reaching the two opposite sides of a diaphragm will not displace the same, I use sound-collecting elements and connect the same so they feed to opposite sides of the diaphragm of a microphone.

Each sound collecting element may consist of a single tubular member, but as a single member has a certain resonance frequency of its own and discriminates against other frequencies, I prefer to use for each element a plurality of tubular members whose individual cross sections are small with respect to the wave length of the sound to be received.

Although in principle I can use any type of microphone, I prefer to use a microphone of the electrostatic type, as the same gives particularly good results and considerably simplifies the construction of the device.

To make the device sensitive to sound of a given frequency I provide adjusting means for changing the length of the collecting elements, and to make the device sensitive to a given band of frequencies I provide means to give the tubular members of each collecting element different lengths. Furthermore, I may use a common adjusting means in order that the adjustment of the two elements be effected simultaneously and in the same manner.

Still further objects and advantages attaching to the device and its use and operation will be apparent to those skilled in the art from the following particular description.

In order that the invention may be clearly understood and readily carried into effect, I shall describe the same in more detail with reference to the accompanying drawing, in which:

Figure 1 is a side view of a device according to the invention,

Fig. 2 is a top view partly in section of the device of Fig. 1, and

Fig. 3 is a sectional view along line 3—3 of Fig. 2.

As shown in the drawing, the device comprises two collecting elements A and B, which are of similar construction, and a microphone 1; the device being mounted on a suitable support 2 so as to be rotatable about a vertical axis C—C.

Microphone 1, which is of the electrostatic type, comprises a suitable housing 3. Within the central portion of housing 3 and supported by insulating blocks 8 are a diaphragm 6 and two metal screens 7. Diaphragm 6 and the left-hand screen 7 are connected through conductors 16 and 15 respectively, to the grid 18 and cathode 19 of a triode 17. The plate circuit of triode 17 feeds to the input of an amplifier 20 to whose output is connected a pair of headphones 21. As such circuits, as well as the construction of the amplifier itself, are well known in the art, a detailed description and illustration of the same is believed to be unnecessary. However, it should be noted that the inner surface of the housing 3 is preferably provided in a manner known per se with sound-absorbent material 4 to eliminate reflection and standing waves.

A shutter is provided in order that sound entering through collecting element B can be prevented from reaching diaphragm 6.

As shown more clearly in Fig. 3, the shutter comprises a stationary disc 9 fixed in the housing 3 and provided with nine holes 10. Behind disc 9 and slidably supported on the housing 3 by rods 13 is a movable plate 11 provided with holes 12 which upon movement of plate 11 can be placed in alignment with holes 10.

It will be noted that a disc 9 is provided on the left hand side of diaphragm 6. This disc and the right-hand screen 7 are provided to make the microphone symmetrical acoustically.

The collecting element A comprises nine L-shaped tubes 25 having one of their ends secured to the housing 3. Telescoping into the free ends of tubes 25 are nine straight tubes 26. As shown more clearly in Fig. 1, each of the three vertical rows of tubes 26 are held together by a clamp 27. The outer clamp is provided with pins 31, and the center clamp is provided with a pin 28. Pivoted on the pin 28 of the center clamp is a lever 29 provided with slots 30 which cooperate with the pins 31 of the outer clamps. As the collecting element B is of similar construction, description of the same becomes unnecessary.

Tubes 25 and 26 may be of metal, for instance copper, or of Bakelite. If they are of metal I prefer to cover them with a suitable sound absorbent material (not shown), or the microphone 1 and tubes 25 may be embedded in a casing of sound-absorbent material.

In the position shown the receiving element A is tuned to a certain frequency, i. e. the length of each composite tube 25—26 is the same. If lever 29 is translated, the length of all these composite tubes changes together, and in this manner the element can be adjusted to another given frequency. On the other hand, if lever 29 is rotated about pin 28 the lengths of the composite tubes are changed with respect to each other and the element is made responsive to a range of frequencies. Element B can be adjusted in a similar manner, and as shown levers 29 are interconnected so that this adjustment takes place simultaneously by means of a common control mechanism.

The control mechanism comprises a supporting member 43 supported at its ends from tubes 25 and carrying two guides 44 provided with stops 46. A member 47, which is provided with two holes 45 through which the guides 44 extend, has its ends secured to the center clamps 27 and carries a pivot 41 upon which is mounted a lever 40 having two handles 42. Pivoted on member 47 are two bent levers 35 which are provided on one end with a slot fitting over pins in levers 29, and whose other ends are connected by links 36 to the lever 40. Thus, if lever 40 is rotated about pin 41 the tubes of each of the elements A and B will be changed in length with respect to each other. On the other hand if lever 40 is translated the length of all the composite tubes 25—26 will be changed the same amount.

In operating the device the disc 11 is moved into the position shown in Fig. 3, and the device is rotated about a vertical axis so that there is a maximum signal in the earphones 21. The lever 40 is then translated and/or rotated so that the element A is tuned to the desired frequency or band of frequencies, and element B is automatically tuned to the same frequency or band.

The disc 11 is moved into the position shown in Fig. 2, in which case both elements A and B are operative. The device is then rotated slightly about the vertical axis until there is a minimum signal response in the earphones. When the device is in this position the direction of propagation of the sound has been accurately determined.

While I have described my invention in connection with specific examples and applications, I do not wish to be limited thereto, but desire the appended claims to be construed as broadly as is permissible in view of the prior art.

What I claim is:

1. In a device for determining the direction of propagation of sound waves, a diaphragm, two groups of open ended tubular members pointing in the same direction, each group having a common end spaced from opposite sides of said diaphragm, means defining an air chamber between one of said common ends and one side of said diaphragm, means defining an air chamber between the other of said common ends and the other side of said diaphragm, an open ended tubular element for each of said tubular members adjustably cooperating therewith for varying the effective length of said tubular members, and common control means for adjusting each of said tubular elements of one of said groups a varying amount to thereby tune each of said tubular members to resonate at a particular frequency and for simultaneously making identical adjustments of the said tubular elements of the other of said groups, whereby a particular frequency or group of frequencies are caused to impinge upon said diaphragm.

2. In a device for determining the direction of propagation of sound waves, a diaphragm, two groups of open ended tubular members, each group having a common end spaced from opposite sides of said diaphragm, means defining an air chamber between one of said common ends and one side of said diaphragm, means defining an air chamber between the other of said common ends and the other side of said diaphragm, means in said chambers for preventing resonance therein, an open ended tubular element for each of said tubular members adjustably cooperating therewith for varying the effective length of said tubular members, means including said tubular elements for simultaneously adjusting the effective length of all of said tubular members in one of said groups to thereby tune at least one of the members to resonate at a particular frequency of propagated sound, and means including said tubular elements for thereafter varying the effective length of the remaining tubular members of said one of said groups to thereby tune the said remaining members to resonate at the same said frequency of propagated sound, said last two mentioned means simultaneously and identically adjusting the effective length of said tubular members in the other of said groups to resonate at said particular frequency of propagated sound, whereby only said particular frequency of propagated sound is caused to impinge upon said diaphragm.

3. In a device for determining the direction of propagation of sound waves, a diaphragm, two groups of open ended tubular members pointing in the same direction, each group having a common end spaced from opposite sides of said diaphragm, means defining an air chamber between one of said common ends and one side of said diaphragm, means defining an air chamber between the other of said common ends and the other side of said diaphragm, an open ended tubular element for each of said tubular members adjustably cooperating therewith for varying the effective length of said tubular members, means including a frame member for adjusting all of said tubular elements of each of said groups to thereby simultaneously vary the effective length of all of said tubular members the same amount, and common control means pivotally mounted on said frame member for adjusting each of said tubular elements of one of said groups to vary the effective length of each of said tubular members with respect to each of the other tubular members of said group to thereby tune each of said tubular members to resonate at the frequency of sound propagated and for simultaneously making identical variations of the effective length of said tubular members of the other of said groups, whereby a particular frequency or group of frequencies are caused to impinge upon said diaphragm.

4. In a sound responsive device, a sound chamber containing a diaphragm, a plurality of tubes communicating with said chamber on each side of said diaphragm, the open end of each of said tubes pointing in the same direction and each of said tubes resonating at a particular frequency of sound, an adjusting device for varying said tubes to cause each to resonate at different frequencies, said device, when translated, simultaneously varying all of said tubes to raise or lower the band of frequencies at which said tubes resonate, and said device, when rotated, simultaneously varying said tubes to thereby vary the width of the band of frequencies at which said tubes resonate.

GABRIEL M. GIANNINI.